United States Patent [19]

Homan et al.

[11] 4,039,504

[45] Aug. 2, 1977

[54] MERCAPTOSILOXANE ELASTOMER AND METHOD OF PREPARATION

[75] Inventors: Gary R. Homan; Chi-Long Lee, both of Midland, Mich.

[73] Assignee: Dow Corning Corporation, Midland, Mich.

[21] Appl. No.: 663,328

[22] Filed: Mar. 3, 1976

[51] Int. Cl.$^2$ ............................................. C08L 83/04
[52] U.S. Cl. .......................... 260/37 SB; 260/46.5 G; 260/46.5 UA
[58] Field of Search .................. 260/46.5 UA, 46.5 E, 260/37 SB, 824

[56] References Cited

U.S. PATENT DOCUMENTS

| 3,445,419 | 5/1969 | Vanderlinde | 260/46.5 E X |
| 3,816,282 | 6/1974 | Viventi | 204/159.13 |

FOREIGN PATENT DOCUMENTS 2,008,426  9/1970  Germany

*Primary Examiner*—Lewis T. Jacobs
*Attorney, Agent, or Firm*—Roger H. Borrousch

[57] ABSTRACT

Mixing a polydimethylsiloxane having from 15 to 30 mol percent methylvinylsiloxane units, a mercaptoorganopolysiloxane, an organic peroxide and optionally a filler provides a composition which cures to an elastomer at room temperature or by heating. The elastomers are useful as sealants and rubber articles.

3 Claims, No Drawings

MERCAPTOSILOXANE ELASTOMER AND METHOD OF PREPARATION

BACKGROUND OF THE INVENTION
1. Field of the Invention

This invention relates to silicone elastomers containing sulfur and methods of their preparation.
2. Description of the Prior Art Compositions containing mercaptoorgano functional siloxanes and aliphatically unsaturated organosiloxanes have been described in the prior art. For example, Viventi in U.S. Pat. No. 3,816,282 teaches silicone rubber compositions which cure at room temperature in the presence of electromagnetic and particulate radiation. The compositions exposed to the radiation for curing comprise an organopolysiloxane having a viscosity of 100 to 100,000 centipoise at 25° C., 0.1 to 2.0 mole percent of the organic groups as silicon-bonded vinyl radicals and from 1.98 to 2.05 organic groups per silicon atom, an organopolysiloxane fluid having the formula

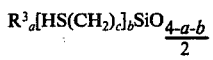

where $R^3$ is alkyl or aryl of up to 18 carbon atoms, $c$ is 1 to 25, $a$ is from 0.088 to 2.08, $b$ is from 0.009 to 0.97 and $a + b$ is from 2.019 to 2.16 and the number of mercapto siloxane units equal or exceed the number of non mercapto siloxane units, and from 0.025% to 1% by weight of the composition of a free radical source which includes certain organic peroxides.

Bazant et al. in German Patent Publication (OLS) No. 2,008,426 discloses five different possibilities to make three dimensionally crosslinked silicone polymers. These reactions were found to proceed in the presence of radical reaction initiators at a temperature of 30°–110° C or by UV light initiation. The five possibilities are defined as follows: One possibility is a reaction between alkenylsiloxanes of the general formula

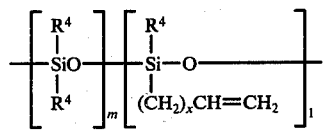

I where $m + l$ is greater than 30, $l$:$m$ is from 1:10 to 1:60, $x$ is 0 to 4 and $R^4$ is alkyl groups of 1 to 6 carbon atoms, cycloalkyl groups of 5 to 8 carbon atoms, aryl groups or siloxy groups, and dithiols of the general formula

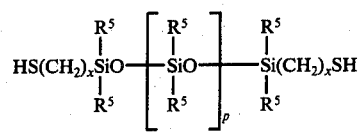

II where $p$ is 0 to 30, $x$ is 1 to 4 and $R^5$ is alkyl groups of 1 to 6 carbon atoms, cycloalkyl groups of 5 to 8 carbon atoms or aryl groups.

The second possibility is reactions between alkenylsiloxanes of the general formula I and high molecular thioalkylpolysiloxanes of the general formula

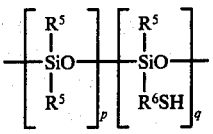

III where $p + q$ is greather than 30, $q$:$p$ is 1:10 to 1:60, $R^5$ is defined above and $R^6$ is an alkylene group of 1 to 6 carbon atoms, a cycloalkylene group of 5 to 8 carbon atoms or an arylene group.

The third possibility is reactions between the thioalkylpolysiloxanes of the general formula III and low molecular alkenylsiloxanes of the general formula

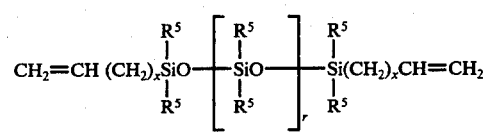

IV where $r$ is 0 to 30, $x$ is 0 to 4 and $R^5$ is defined above.

The fourth possibility is reactions of high molecular thioalkyl- and alkenyl substituted siloxanes of the general formula

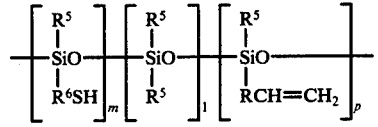

where $m + l + p$ is greater than 30, $m$:$p$ is 1 to 1:60, and $R^5$ and $R^6$ are as defined above.

The fifth possibility is reactions between thioalkylpolysiloxanes and organic diisocyanates.

George A. Gant in U.S. patent application Ser. No. 401,791, filed September 28, 1973, entitled "UV Curable Compositions" and assigned to the same assignee as the present application, discloses a composition which is curable with ultraviolet light consisting essentially of a siloxane having 0.1 to 100 mole percent mercapto functional siloxane units of the formula

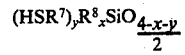

and any other siloxane unit being of the formula

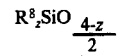

V where $x$ is 0 to 2, $y$ is 1 to 2, $x + y$ is 1 to 3, $z$ is 0 to 3, $R^7$ is an alkylene radical and $R^8$ is a monovalent hydrocarbon radical or a monovalent halogenated hydrocarbon radical, a siloxane having 0.1 to 100 mole percent of vinyl siloxane units of the formula

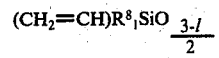

where $l$ is 0 to 2 and $R^8$ is defined above and any other non-vinyl containing siloxane units are defined by formula V, and a photosensitizing amount of a photosensitizer, where the ratio of vinyl to mercapto is from 1:100 to 100:1.

Although the prior art describes that compositions containing mercapto functional siloxanes and vinyl containing siloxanes can be cured and that some compositions cure to elastomeric products, it is not obvious that certain compositions can be cured at room temperature as well as with heat with organic peroxide alone. For example, Viventi requires specific mercapto containing siloxanes and radiation for curing his composition, Bazant et al. place strict limitations on the type of alkenyl siloxanes and mercapto siloxanes which can be combined to provide a three dimensional crosslinked siloxane and finally Gant requires the presence of a photosensitizer and ultraviolet light to cure his compositions. Thus, it was unexpected that polydiorganosiloxanes having a high vinyl content and a class of mercaptoorganopolysiloxanes could be cured to an elastomer with organic peroxide at both room temperature and by heating.

SUMMARY OF THE INVENTION

This invention relates to compositions which are curable to elastomers at room temperature and with heat where the compositions comprise a polydiorganosiloxane having a viscosity at least 0.3 Pa.s at 25° C and 15 to 30 mol percent methylvinylsiloxane units, a mercaptoorganopolysiloxane having at least two sulfur atoms per molecule and up to 8 mol percent (mercaptoalkyl)methylsiloxane units, an organic peroxide and optionally a filler.

This invention also relates to a method of preparing an elastomer by mixing the polydiorganosiloxane, the mercaptoorganopolysiloxane, the organic peroxide and optionally filler below a temperature of 50° C and curing at a temperature above 20° C.

These compositions can be used as sealants and molded articles.

DESCRIPTION OF THE INVENTION

This invention relates to a composition curable to an elastomer comprising a material prepared by mixing (A) a vinyl containing polydiorganosiloxane having a viscosity of at least 0.3 Pa.s at 25° C. and consisting essentially of a combination of two triorganosiloxy units selected from the group consisting of trimethylsiloxy units, dimethylvinylsiloxy units and methylphenylvinylsiloxy units, from 70 to 85 mol percent dimethylsiloxane units and from 15 to 30 mol percent methylvinylsiloxane units, where the total number of dimethylsiloxane units and methylvinylsiloxane units equal 100 mol percent, (B) a mercaptoorganopolysiloxane consisting essentially of a combination of two trimethylsiloxy units, at least 92 mol percent dimethylsiloxane units and at least two (mercaptoalkyl)methylsiloxane units per molecule up to 8 mol percent (mercaptoalkyl)methylsiloxane units, where the total number of dimethylsiloxane units and (mercaptoalkyl)methylsiloxane units, the mercaptoalkyl groups having from 1 to 4 inclusive carbon atoms, said mercaptoorganopolysiloxane having a molecular weight of at least 1,000, (A) and (B) being combined in a weight ratio sufficient enough to provide a molar ratio of moles of —SH group in (B) per mole of vinyl radical in (A) of 1:1 to 10:1, (C) an organic peroxide in an amount of from 1.4 to 5.5 parts by weight based on 100 parts by weight of (A) and (B) combined, and (D) a filler in an amount of from 0 to 100 parts by weight per 100 parts by weight of (A) and (B) combined.

The compositions of the present invention are prepared by mixing the ingredients (A), (B), (C) and (D). The resulting mixtures undergo some reaction as soon as they are mixed, but have a reasonable pot life to be useful. Inasmuch as, crosslinking reaction begins upon mixing the combination of (A), (B), (C) and (D) should not be prepared too far in advance of the time cure is desired. Thus, one should determine the pot life by using small samples for each composition prior to compounding large batches of the compositions defined herein. The pot life can range from a few hours up to several weeks at room temperature. For purposes of storage, the compositions of this invention are two component or two package compositions. One can combine (A) and (C), and optionally (D) a filler for one package and (B) as a second package or one can combine part of (A), all of (C) and part of (D) in one package and in a second package combine the remainder of (A) and the remainder of (D) and all of (B). Various combinations can be used for purposes of storage, however it is cautioned that the combination of (B) and (C) may result in gelation of that mixture on storage.

Preferably, (A), (B), (C) and (D) are mixed at a temperature below 50° C. so that one does not activate the organic peroxide prematurally and cause gelation or curing during the mixing procedure.

After (A), (B), (C) and (D) are mixed, the composition will cure at room temperature, above 20° C. Compositions are best cured in the presence of oxygen gas, such as air.

The type of mixing procedure is not critical as long as it does not generate excessive heating. For high viscosity composition, such as those containing gums or high filler loadings, a two-roll mill can be used for mixing but is preferably cooled, such as by using the internal water cooled type mill. Also the composition can be combined and mixed by using a multi-feed extruder wherein two or more components can be fed into a mixer and the composition is extruded from the apparatus. The resulting extruded article can be then left to cure at room temperature or it can be heated to accelerate the cure.

The polydiorganosiloxane of (A) is a vinyl containing siloxane polymer consisting essentially of a triorganosiloxy endblocked copolymer of 70 to 85 mol percent dimethylsiloxane units and 15 to 30 mol percent methylvinylsiloxane units. The polydiorganosiloxane had a viscosity of at least 0.3 pascal.second (Pa.s) at 25° C. and includes polymers from fluids to gums. The flowable polydiorganosiloxanes are particularly suitable for making sealants and the gum consistency polydiorganosiloxanes are particularly useful for making extrudable articles. These polydiorganosiloxanes are known in the art.

The mercaptoorganopolysiloxanes of (B) consist essentially of a trimethylsiloxy endblocked siloxane copolymer containing at least two (mercaptoalkyl)methylsiloxane units per molecule and up to 8 mol percent (mercaptoalkyl)methylsiloxane units and at least 92 mol percent dimethylsiloxane units. The mercaptoalkyl groups can be illustrated by gamma-mercaptopropyl, beta-mercaptoethyl, delta-mercaptobutyl, alpha-mercaptoethyl and mercaptomethyl. The mercaptoorganopolysiloxanes have a molecular weight greater than 1000 and preferably greater than 10,000. The mercaptoorganopolysiloxanes are known in the art as evidenced by the prior art cited herein.

The organic peroxide of (C) can be any of the conventional organic peroxides, such as 2,4-dichlorobenzoyl peroxide, tertiary-butyl perbenzoate, benzoyl peroxide, di-tertiary-butyl peroxide, tertiary-butyl peroctoate, dicumyl peroxide and 2,5-bis(tertiary-butylperoxy)-2,5-dimethylhexane.

Filler (D) is preferably used in the compositions of this invention, but are not required. The fillers can be both treated and untreated reinforcing fillers, such as fume silica and fume silica having triorganosiloxy groups, such as trimethylsiloxy groups on the surface, carbon black or precipitated silica, and extending fillers such as crushed or ground quartz, diatomaceous earth, and calcium carbonate.

The compositions of the present invention are made by mixing (A) and (B) in weight ratios sufficient enough to provide a molar ratio of moles of —SH group in (B) per mole of vinyl in (A) of from 1:1 to 10:1, preferably 1.5:1 to 5:1. The organic peroxide of (C) is present in amounts of from 1.4 to 5.5 parts by weight per 100 parts by weight of (A) and (B) combined. The compositions can preferably contain filler up to 100 parts by weight per 100 parts by weight of (A) and (B) combined. Particularly, useful compositions are those which contain from 40 to 90 weight percent (A) and 10 to 60 weight percent (B).

The compositions of this invention cure to elastomers either at room temperature or with heating, such as hot air vulcanization. The resulting elastomer has a dry or non-tacky surface and has good adhesion to substrates against which the compositions are cured. Air inhibition which is observed with conventional non-mercapto-containing peroxide cured silicone rubber composition is not observed and the inhibition by various materials such as sulfur and phosphorus in the platinum catalyzed compositions containing aliphatic unsaturated siloxanes and SiH containing siloxanes, is not observed.

The following example is presented for illustrative purposes and should not be construed as limiting the invention which is properly delineated in the claims.

EXAMPLE

An elastomer was prepared by mixing 98.7 g. of a trimethylsiloxy endblocked siloxane copolymer having (gamma-mercaptopropyl)methylsiloxane units and dimethylsiloxane units with 0.228 weight percent —SH group and a molecular weight of 65.500 1.27 g. of a trimethylsiloxy endblocked polydiorganosiloxane having dimethylsiloxane units and methylvinylsiloxane units with 7.26 weight percent vinyl radicals and a viscosity of 21.2 Pa.s at 25° C., 30.0 g. of a fume silica filler having the surface treated with trimethylsiloxy units and 7.5 g. of a peroxide mixture having 50 weight percent 2,4-dichlorobenzoyl peroxide and 50 weight percent of a trimethylsiloxy endblocked polydimethylsiloxane. The composition cured to an elastomer with a track free surface in 18 hours at room temperature, in 15 minutes at 175° C. when press cured in the absence of air and in 3 minutes at 150° C. in the presence of oxygen gas (air).

That which is claimed is:

1. A composition curable to an elastomer comprising a material prepared by mixing
   A. a vinyl containing polydiorganosiloxane having a viscosity of at least 0.3 Pa.s at 25° C. and consisting essentially of a combination of two triorganosiloxy units selected from the group consisting of trimethylsiloxy units, dimethylvinylsiloxy units and methylphenylvinylsiloxy units, from 70 to 85 mol percent dimethylsiloxane units and from 15 to 30 mol percent methylvinylsiloxane units, where the total number of dimethylsiloxane units and methylvinylsiloxane units equal 100 mol percent,
   B. a mercaptoorganopolysiloxane consisting essentially of a combination of two trimethylsiloxy units, at least 92 mol percent dimethylsiloxane units and at least two (mercaptoalkyl)methylsiloxane units per molecule up to 8 mol percent (mercaptoalkyl)methylsiloxane units, where the total number of dimethylsiloxane units and (mercaptoalkyl)methylsiloxane B units is 100 mol percent, the mercaptoalkyl groups having from 1 to 4 inclusive carbon atoms, said mercaptoorganopolysiloxane having a molecular weight of at least 1,000, (A) and (B) being combined in a weight ratio sufficient enough to provide a molar ratio of moles of —SH group in (B) per mole of vinyl radical in (A) of 1:1 to 10:1,
   C. an organic peroxide in an amount of from 1.4 to 5.5 parts by weight based on 100 parts by weight of (A) and (B) combined, and
   D. a filler in an amount of from 0 to 100 parts by weight per 100 parts by weight of (A) and (B) combined.

2. A method of preparing an elastomer comprising (I) mixing at a temperature below 50° C.
   A. a vinyl containing polydiorganosiloxane having a viscosity of at least 0.3 Pa.s at 25° C. and consisting essentially of a combination of two triorganosiloxy units selected from the group consisting of trimethylsiloxy units, dimethylvinylsiloxy units and methylphenylvinylsiloxy units, from 70 to 85 mol percent dimethylsiloxane units and from 15 to 30 mol percent methylvinylsiloxane units, where the total number of dimethylsiloxane units and methylvinylsiloxane units equal 100 mol percent,
   B. a mercaptoorganopolysiloxane consisting essentially of a combination of two trimethylsiloxy units, at least 92 mol percent dimethylsiloxane units and at least two (mercaptoalkyl)methylsiloxane units per molecule up to 8 mol percent (mercaptoalkyl)methylsiloxane units, where the total number of dimethylsiloxane units and (mercaptoalkyl)methylsiloxane units is 100 mol percent, the mercaptoalkyl groups having from 1 to 4 inclusive carbon atoms, said mercaptoorganopolysiloxane having a molecular weight of at least 1,000, (A) and (B) being combined in a weight ratio sufficient enough to provide a molar ratio of moles of —SH group in (B) per mole of vinyl radical in (A) of 1:1 to 10:1,
   C. an organic peroxide in an amount of from 1.4 to 5.5 parts by weight based on 100 parts by weight of (A) and (B) combined, and
   D. a filler in an amount of from 0 to 100 parts by weight per 100 parts by weight of (A) and (B) combined, thereafter (II) curing the resulting mixture of (I) above 20° C.

3. The method in accordance with claim 2 in which the resulting mixture of (I) is heated above 50° C.

* * * * *

UNITED STATES PATENT AND TRADEMARK OFFICE
CERTIFICATE OF CORRECTION

PATENT NO. : 4,039,504

DATED : August 2, 1977

INVENTOR(S) : Gary R. Homan and Chi-Long Lee

It is certified that error appears in the above-identified patent and that said Letters Patent are hereby corrected as shown below:

Column 2, line 9 - the word "greather" should read "greater"

Column 4, line 48 - the word "had" shoud read "has"

Column 5, line 47 - the phrase "of 65.500 1.27 g." should read "of 65,500, 1.27 g."

Column 5, line 56 - the word "track" should read "tack"

Column 6, line 16 - the letter "B" should be deleted

Signed and Sealed this

Eighth Day of December 1981

[SEAL]

Attest:

Attesting Officer

GERALD J. MOSSINGHOFF

Commissioner of Patents and Trademarks